(12) United States Patent
Cooke et al.

(10) Patent No.: US 7,778,234 B2
(45) Date of Patent: Aug. 17, 2010

(54) LOCAL PROVISIONING OF BANDWIDTH AND OTHER NETWORK RESOURCES

(75) Inventors: Jawhny Cooke, San Jose, CA (US); Rommel Rey Bajamundi, San Jose, CA (US); Najeeb Haddad, South San Francisco, CA (US); Charles J. Kulas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 711 days.

(21) Appl. No.: 11/094,888

(22) Filed: Mar. 30, 2005

(65) Prior Publication Data

US 2006/0221934 A1  Oct. 5, 2006

(51) Int. Cl.
*H04L 12/28* (2006.01)

(52) U.S. Cl. .................. 370/351; 370/352; 370/401; 370/466; 370/389

(58) Field of Classification Search ......... 709/312–318, 709/245; 370/401, 466, 352, 353, 468, 474; 700/90
See application file for complete search history.

(56) References Cited

U.S. PATENT DOCUMENTS

| | | | | |
|---|---|---|---|---|
| 6,363,434 | B1* | 3/2002 | Eytchison | 719/313 |
| 6,792,323 | B2* | 9/2004 | Krzyzanowski et al. | 700/90 |
| 7,035,270 | B2* | 4/2006 | Moore et al. | 370/401 |
| 7,430,187 | B2 | 9/2008 | Holt et al. | |
| 7,512,683 | B2 | 3/2009 | Anschutz et al. | |
| 2004/0017825 | A1* | 1/2004 | Stanwood et al. | 370/468 |
| 2005/0002335 | A1 | 1/2005 | Adamczyk et al. | |
| 2005/0002392 | A1* | 1/2005 | Vijeh et al. | 370/389 |
| 2005/0015494 | A1 | 1/2005 | Adamczyk et al. | |
| 2006/0028981 | A1 | 2/2006 | Wright | |
| 2006/0039381 | A1 | 2/2006 | Anschutz et al. | |

OTHER PUBLICATIONS

PacketCable Dynamic Quality of Service Specification, 1999-2005 by CableTelevision Labs., Inc.*
Technical Report DSL Forum TR-094 entitled: "Multi-Service Delivery Framework for Home Networks" dated Aug. 2004.
Technical Report DSL Forum TR-064 entitled: "LAN-Side DSL CPE Configuration" dated May 2004.
U.S. Appl. No. 11/186,208, filed Jul. 20, 2005, Office Action Apr. 1, 2010.

* cited by examiner

*Primary Examiner*—Curtis Kuntz
*Assistant Examiner*—Phung-Hoang J Nguyen
(74) *Attorney, Agent, or Firm*—Hickman Palermo Truong & Becker LLP

(57) ABSTRACT

A system for local allocation or provisioning of resources in a network. Allocation rules are defined based on one or more factors of user identity, device identity and device location. A communication is given a priority level based on the rules. A device in the network performs local provisioning according to the rule definitions. Rule definitions can be set or changed via a user interface. Automated ways to obtain factor values can be used such as automatic identification of users, devices, and location. Other possible factors to use to determine resource allocation can be time of day, date, identity of an originating or target device, identity of a caller or callee, etc. Resources that can be allocated include bandwidth, processing cycles, network storage and power.

20 Claims, 3 Drawing Sheets

LOCAL PROVISIONING OF BANDWIDTH AND OTHER NETWORK RESOURCES

BACKGROUND OF THE INVENTION

This invention relates in general to digital network communication and more specifically to control and management of traffic over a network within a localized area.

Today many homes are provided with relatively high-speed broadband Internet access. Typically, several types of services are provided to residents of a home by devices located within the home. These devices and services make use of a single broadband Internet connection that is shared by use of a home network. Some types of activities and services that are provided to a home include web page viewing, file transfers, voice communication (e.g., voice over Internet Protocol (VoIP)), video on demand (VoD) or near video on demand (nVoD) including streaming audio and video, online gaming, etc. These are loosely classified as three types of data—voice, video and integrated data (VVID)—with online gaming sometimes discussed as a fourth type.

Some services, such as VoIP require a guaranteed amount of bandwidth or the service's performance may become unacceptable. For example, if a VoIP phone device can not transmit or receive its data fast enough a person in a phone conversation can experience interruptions, degradation of sound quality, or other unacceptable effects. On the other hand, a service such as downloading a file in a background, or batch, mode can often tolerate a slowdown or short suspension of the service since a human user is not paying immediate attention to the operation of the service.

Attempts to manage and control shared bandwidth among multiple services so that a particular service can have a guaranteed, necessary or predictable amount of resources is referred to as quality of service (QoS). QoS mechanisms attempt to provide shared bandwidth based on classification or type of traffic. Some specifications that define mechanisms, interfaces, protocols and other characteristics are described for example in IEEE 802.1q (VLAN) and IEEE 802.1D Annex H.2 (User Priorities and Traffic Classes).

DETAILED DESCRIPTION OF EMBODIMENTS OF THE INVENTION

Figure 1:
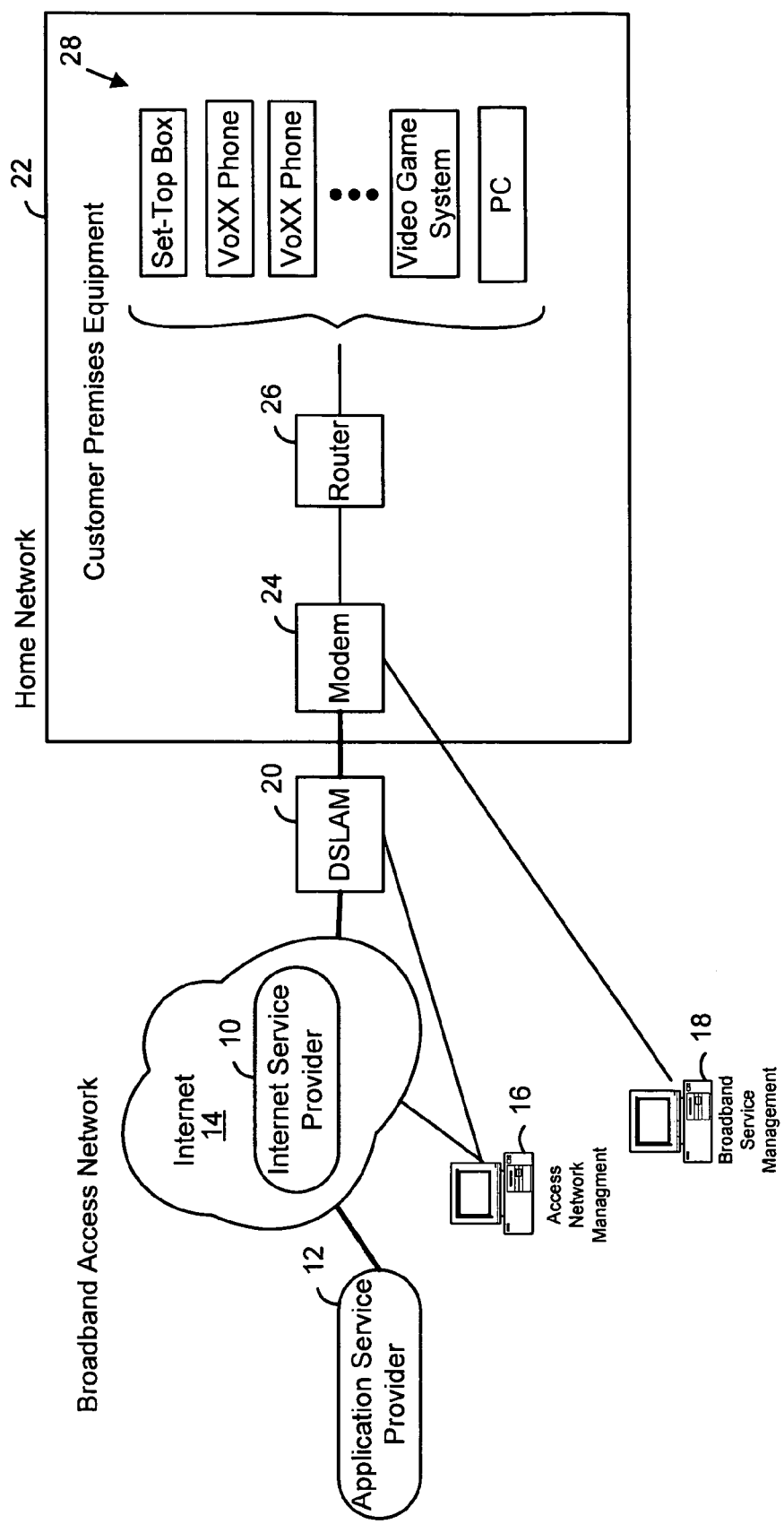
FIG. 1 illustrates a home network connected to the Internet, relevant devices and participating entities.

FIG. 1 illustrates a home network and arrangement for accessing the Internet from the home network. In FIG. 1, an Internet service provider (ISP) 10 owns and operates equipment, facilities and resources to allow a user to access the Internet. For example, equipment can include lines, servers, routers, switches, backbones, repeaters and other equipment. Facilities include collections of equipment and people for managing, maintaining, provisioning and selling services and resources. Resources can include bandwidth, storage, processing power, etc.

Internet 14 can also be used by application service provider (ASP) 12 to provide functionality to a user over the Internet. Other types of Internet services can be provided such as information from websites, file transfers, voice or video transfers, etc. In a typical arrangement, the ISP can operate access network management 16 to manage and track usage. One device that is important to control and manage Internet access and use is Digital Subscriber Line Access Manager (DSLAM) 20. The DSLAM allows many users (e.g., several hundred) over a relatively large area (e.g., 1-2 mile radius) to connect via asymmetrical digital subscriber lines (ADSL) to share an asynchronous transfer mode (ATM) line. The ATM line is a high-bandwidth connection to a wide-area network (WAN). The DSLAM is usually located at a central office where splitters, DSL modems and other equipment is used to connect data traffic from a "local loop" to the WAN.

Access Network Management 16 is typically performed by the ISP to ensure, or limit, bandwidth provisioning and to handle other aspects of network service providing such as creating accounts, restricting access, billing customers, etc. Note that other arrangements of equipment, management and control are possible from those specific examples described herein.

A home network includes Customer Premises Equipment (CPE) that reside within a dwelling or other localized structure or area. One distinguishing feature of the CPE is that it is typically purchased and under the control of a home owner or other local user. However, other entities, such as an ISP, cable operator, device manufacturer, etc., may also retain a degree of control over a CPE. In FIG. 1, home network 22 includes modem 24, router 26, and various devices coupled to the router at 28 such as a set-top box, VoIP phones, video game system, personal computer, etc. In general, any type of network, consumer electronic, or other device can be coupled to a home network and can benefit from features of the present invention. Note that FIG. 1 illustrates that a Broadband Service Management entity can have a degree of control over a modem in a home network. Other types of such external control can be provided by manufacturers, distributors, suppliers or other entities with or without the home network owner's knowledge or desire.

Figure 2:
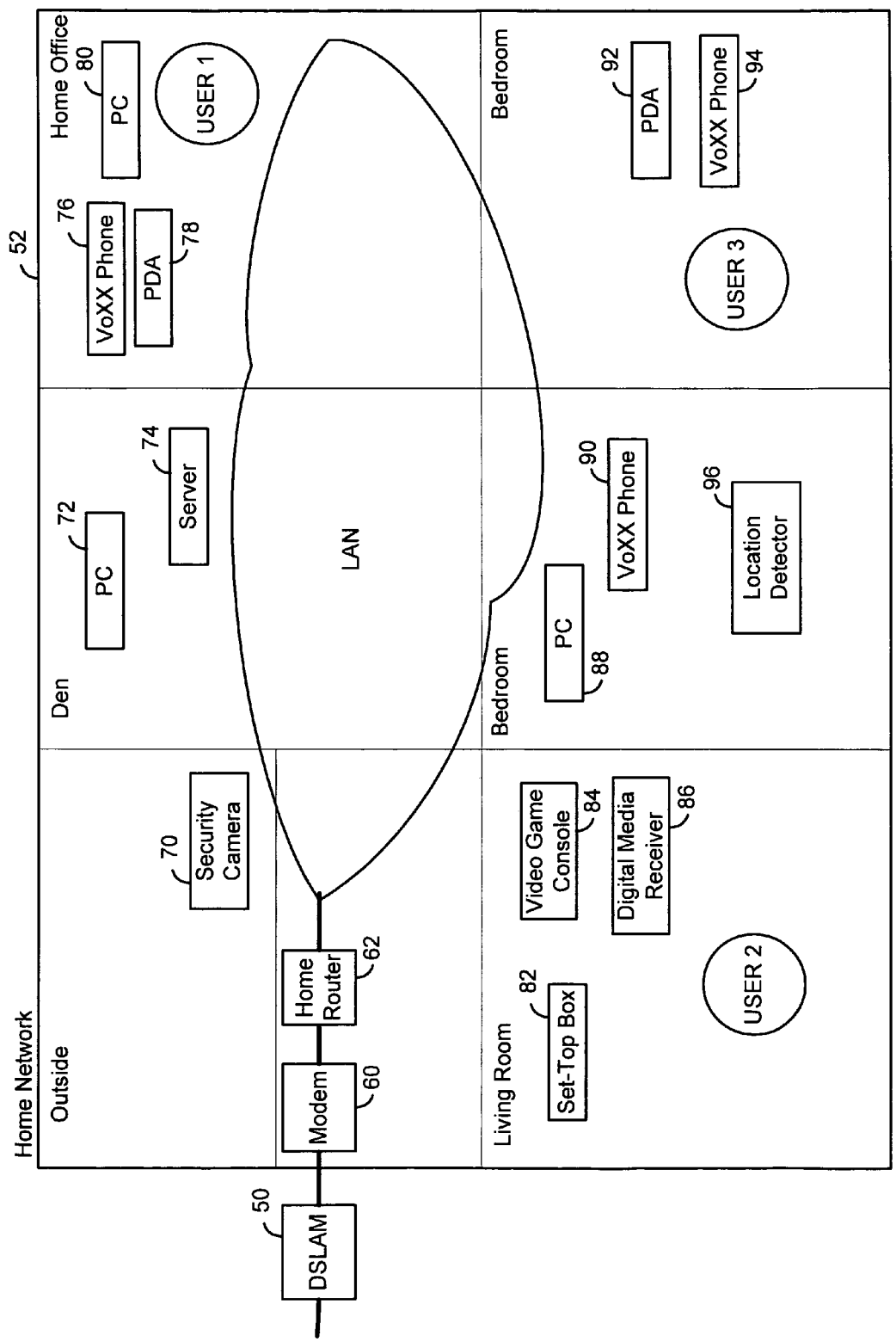
FIG. 2 shows details of a home network.

FIG. 2 shows details of a home network. In FIG. 2, home network 52 includes modem 60 and router 62 for interconnecting other CPE devices via LAN 64. In general, any type of physical network can be used including wired, wireless, fiber optic, infrared, etc. More or less devices can be employed. For example, in some applications a router may not be used and a switch can be added. Or multiple routers and switches can be used. The network topology and other characteristics such as the protocols used and standards for communication, processing, storage, power, etc. can be modified as desired.

In FIG. 2, user network devices are interconnected via LAN 64. These devices include security camera 70, personal computer (PC) 72, server 74, VoXX (e.g., a network phone) 76, personal digital assistant (PDA) 78, PC 80, set-top box 82, video game system 84, digital media receiver 86, PC 88, VoXX phone 90 PDA 92 and VoXX phone 94. Each device is shown as resident in a particular room, area or location of a user premises. For example, security camera 70 is outside the house while PC 72 and server 74 are located within the den of the house. Also illustrated are three different user's identified as USER 1, USER 2 and USER 3.

One embodiment of the invention allows provisioning bandwidth and other resources to a device based on one or more characteristics such as device, location and user identification. For each device can be provided with an identifier that can be a combination of an IP address and port number. Devices can be identified by a cpu identification number (if a processor is present), manufacturer code, uniform products code, or other code. Codes can be obtained automatically or they can be generated and/or obtained manually, or by a combination of manual and automatic operations. By knowing a device's identity, provisioning of network resources can be made device dependent.

Locations can be determined by assigning port numbers to different rooms. This allows a provisioning network device (e.g., a provisioning router or switch as described below) to treat traffic from the location on a prioritized basis for purposes of provisioning or arbitrating bandwidth or another network resource among locations. With port number assignments, all traffic (e.g., packets) coming from devices using the port can be assumed to originate from within the assigned room or area. Other ways to assign a location property to traffic is to use location detector 96 to either detect or interrogate devices within, a known area. Location detector 96 is connected to the home network and relays information to a provisioning device to register device identifiers with the provisioning device in association with a predetermined room or area. A registration infrared signal from a device can be sent when a control is activated by a user (e.g., holding a control panel button on the device down for 5 seconds). Other approaches are possible such as the device emitting a registration signal upon power-up, using a re-emission radio-frequency signal transmitted from the location detector, etc. Each device that a particular location detector senses can be assigned to the room associated with the particular location detector.

Users are associated with devices, or identified as operators of a device. Users can be identified by each user manually entering an ID prior to using a device. Some devices may already require user identification. For example, personal computers, game systems, set-top boxes, etc., may already require user identification that can also be used for provisioning as described herein. Users can also be identified automatically as, for example, by using radio-frequency identification tag (RFID tag) approaches, keycard reading, image recognition (e.g., retinal scanning, fingerprint detection, face recognition), voice recognition, etc. In other cases, devices can be assumed to be associated with a user as, for example, devices that are in a room and the room is associated with the user.

Using the three factors of device, place and user, different rules for provisioning can be set. Not all factors need to be used in each rule. Additional factors can also be used such as time, a communicating second user (e.g., in a VoIP phone call), identity of a communicating other device, ASP or ISP-provided factor or setting, etc. Provisioning actions to meet the rule requirements can be implemented by CPE or non-CPE devices such as a DSLAM, modem switch or other device. Combinations of devices can also be used.

A preferred embodiment of the invention allows a user to set rules based on the user's local needs within the user's home or domain. The user CPE is used as much as possible to achieve the rule requirements. For example, one rule might be to ensure that the bandwidth or data rate of a VoXX call is always provided with a minimum bandwidth so that there is no loss of voice quality (e.g., dropped packets, audio signal degradation) during a specific type of call. The rule can be defined as PLACE dependent (e.g., all devices within the home office area), USER dependent (one of the parents' IDs) or DEVICE dependent (based on a device ID of VoXX Phone 76). If the rule is device dependent then all calls from the specific device will gain the benefit of the guaranteed data rate. If the rule is place dependent then all devices in the home office will have the benefit. If the rule is user dependent then whenever the identified user operates a device, that communication gains the benefit (or detriment) of the rule.

Table I, below, provides examples of conditions can be defined and included in rules by using relational expressions and one or more factors.

TABLE I

IF user_id = = MOTHER THEN priority = 2;
IF user_id != CHILD THEN priority = 3;
IF (user_id = = CHILD) AND (device_id = = GAME_CONSOLE1) then priority = 8;
IF device_id = = VoXX_HANDSET1 then priority = 1;
IF place_id = = HOME_OFFICE then priority = 1;
IF (device = = GAME_CONSOLE) and (10:00pm > Current_Time > 8:00pm) and NOT (user_id = = FATHER) THEN priority = 2 ELSE priority = DENY;

Referring to Table I, the provisioning rule "IF user_id==MOTHER THEN priority=2;" sets a priority of 2 if the person with user ID value "MOTHER" is associated with a communication session. These examples assume that 1 is a highest priority level with 10 being the lowest priority. Naturally, any type of suitable prioritization scheme can be used.

The rule "IF user_id!=CHILD THEN priority=3;" acts to assign a priority level of 3 if the user ID does not have the value CHILD. This rule can provide at least a priority level of 3 if the user is not a child. Such a rule can act to provide a somewhat high priority level as long as a child is not the participant in a communication. The rule "IF (user_id==CHILD) AND (device_id==GAME_CONSOLE1) then priority=8;" acts to set a priority level of 8 (relatively low) if a child is using the home network resources to play games over the Internet. The rule "IF device_id==VoXX_HANDSET1 then priority=1;" sets a highest priority level for a specific VoXX handset. Such a handset can be, for example, in the home office where it is desirable to ensure faultless telephone communications whenever the handset is being used.

The rule "IF place_id==HOME_OFFICE then priority=1;" acts to provide a highest priority for all communications to and from devices in a home office. Referring to FIG. 2, for example, this would include VoXX phone 76, PDA 78 and PC 80. Rules can include more complexity and variation as, for example, the rule "IF (device==GAME_CONSOLE) and (10:00 pm>Current_Time>8:00 pm) and NOT (user_id==FATHER) THEN priority=2 ELSE priority=DENY;". This rule prevents all communications from a game system by anyone except for the father unless the time interval is between 8 and 10 pm. Any other type of combinations of factors and relational expressions are possible. For example, it may be desirable to provide a high priority for communications on any devices depending on the identity, device or place with which a device on the home network is communicating. An identification approach similar to the person, device or place identification described above can be used similarly for a target device with which a device on the home network communicates. This can allow known people (e.g., business partners, relatives, etc.) places (e.g., police, fire, hospital, etc.) or devices (e.g., a cell phone belonging to a family member, etc.) to be used in provisioning rules. Any suitable type of identification can be used for external (i.e., outside of the home network) identification including caller ID, internet protocol (IP) address, port numbers, authentication tickets, etc.

Rule results or goals can be stated in terms of priority levels. Once set, a communication's data (e.g., packets) are assigned that priority level. Packets of a higher priority level can be given preferential treatment in order to meet provisioning goals. The specific way in which packets are handled based on the priority level can vary among implementations. One approach is to allow a user's CPE to perform provisioning such as by giving preferential treatment to packets at a router connected between a home network and a modem. Any of the router's available resources or mechanisms can be used to achieve provisioning. For example, buffer space can be assigned according to the priority levels. Buffer servicing can also be allocated according to packet priority where buffers are given the same priority level as the packets that they are handling. Provisioning goals can be stated in terms of maximum or minimum data rates, peak rates, average rates, or other metrics.

Priority levels can be associated with data packets, blocks, communication sessions or other portions of communication data. At a session level, session initiation protocols can be used to identify the session's priority. At a link level, packets can include information about their priority level as, for example, a bit field in a header used to indicate priority. Details of mechanisms and standards for control and management of network traffic in a home network can be adapted from those described in publications by the DSL Forum such as in Technical Reports TR-094, "Multi-Service Delivery Framework for Home Networks"; and TR-064 "LAN-Side DSL CPE Configuration". These publications are hereby incorporated by reference as if set forth in full in this document for all purposes.

Figure 3:
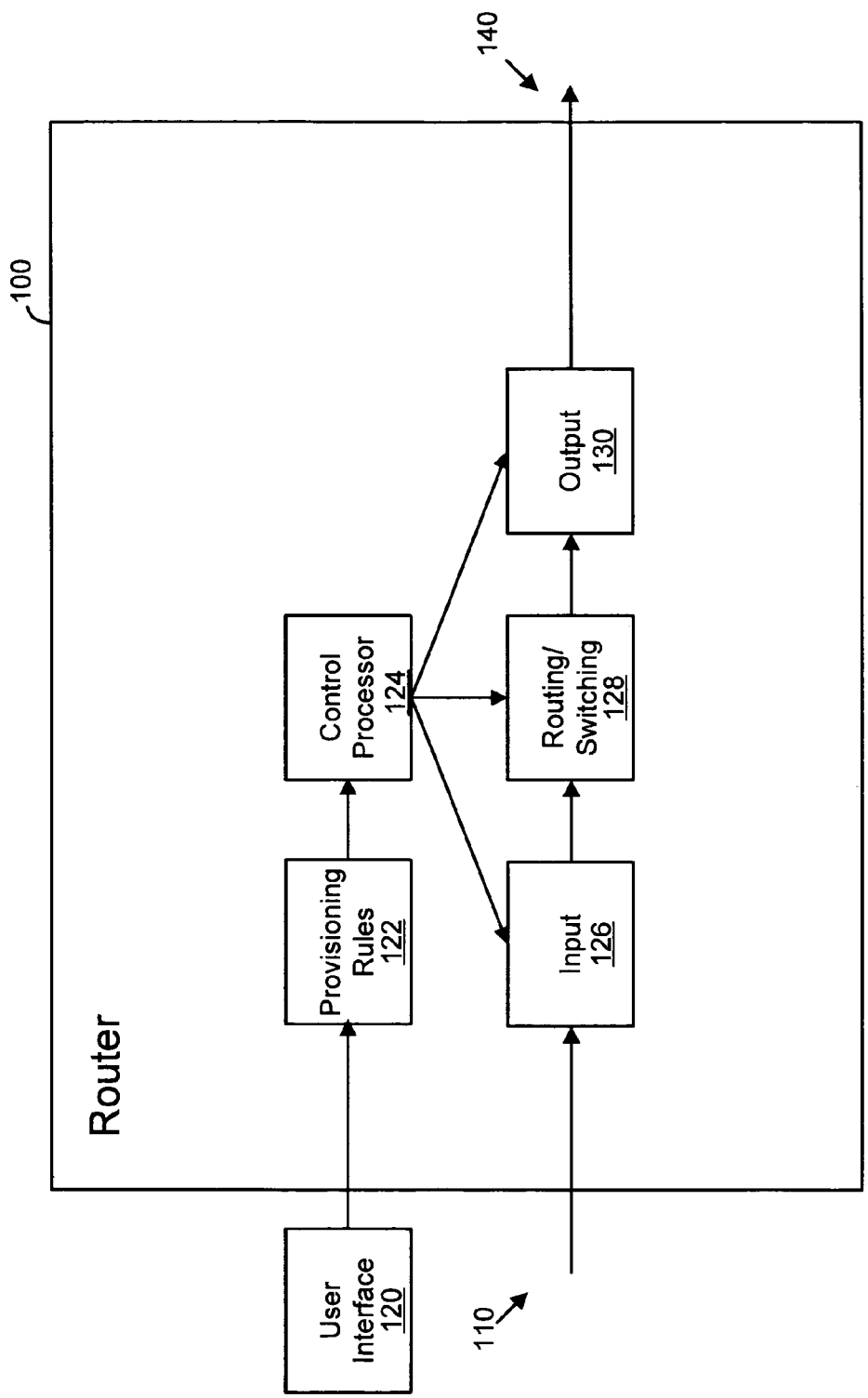
FIG. 3 is a simplified diagram of a router and its subsystems and components.

FIG. 3 shows subsystems and details of a router. Router 100 accepts an input data stream at 110 which provides the data to input module 126. Input module 126 can include circuitry for, e.g., interfacing signals, buffering data, controlling data flow, etc. Control processor 124 coordinates buffering of data and transferring the data (e.g., packets) to output module 130 for transmission to an intended destination. A similar path exists from right-to-left to provide for traffic flow in the opposite direction, although for ease of discussion it is not shown in FIG. 3.

User interface 120 is used to define provisioning rules 122. Provisioning rules 122 are used to assign priority levels to data and to provision data transmission and processing accordingly. User interface 120 can be a web page interface that a user accesses via a device such as a PC, PDA, etc. Another approach is to provide dedicated controls on a physical control panel so that a user can make associations by using buttons, sliders, knobs, etc. Yet another approach is to provide predefined or automated rule generation as where default rules are shipped with the router, downloaded from a third party over the Internet, included with software or other media content, etc.

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention may be described even though such details may vary in, and may not apply to, other embodiments of the invention. For example, Although specific Internet access technologies such as Digital Subscriber Line (DSL) are discussed, any other suitable access technologies, such as CATV over COAX, ADSL, ADSL2plus, VDSL, PON, etc., can be used to provide Internet or other external network communications ability to the home. Although specific network processing devices such as a DSLAM, router, switch, server, etc., may be shown, other embodiments can use any other types of suitable devices to achieve the same or similar functions. Such differences in details are within the scope of the invention.

Although the invention has been described with respect to specific embodiments thereof, these embodiments are merely illustrative, and not restrictive of the invention. For example, although provisioning rules herein have focused on setting relative priorities, any type of performance criteria can be used, such as minimum or maximum data rates, latency, whether certain algorithms are used to improve performance (e.g., error detection and correction, compression), etc. Other resources besides bandwidth can similarly be provisioned. For example, network storage space (e.g., a redundant array of inexpensive disks (RAID), or simply a storage device on a network) can be allocated on the basis of priorities or rule-defined provisioning. Processing cycles can be allocated from grid or utility processing providers. Local power can be provisioned so that in a case of a power outage any limited battery power is apportioned accordingly. Allocation of other resources is possible.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for allocating a network resource in a home network, the method comprising:
    a processor, in a customer premises equipment device of the home network, using a display to present a plurality of provisioning options to a user;
    the processor accepting a signal from a user input device to select one of the plurality of provisioning options, wherein the signal defines a provisioning rule for a particular device coupled to the home network;
    using the processor to track data transferred with the particular device, wherein the processor is coupled to the home network, wherein the processor is resident within a home in which the home network is also resident;
    the processor determining that the particular device's data transfers do not conform to the provisioning rule; and
    the processor causing the particular device's data transfers to conform with the provisioning rule;
    wherein the provisioning rule includes a user identification;
    wherein the provisioning rule allows any of: providing constant bandwidth to the particular device during an entire duration of the particular device's data transfers to the particular device, assigning a particular input device to the particular device, or assigning a storage space to the particular device for storing data transferred to the particular device during the particular device's data transfers;
    wherein the provisioning rule is place dependent, device dependent or user dependent.

2. The method of claim 1, further comprising: using a Boolean expression to determine the provisioning rule.

3. The method of claim 1, wherein the provisioning rule includes a shared storage limitation.

4. The method of claim 1, wherein the provisioning rule includes processing cycles.

5. The method of claim 1, wherein the provisioning rule includes power consumption.

6. The method of claim 1, wherein the provisioning rule includes a present limitation.

7. The method of claim 1, wherein the provisioning rule includes a prospective limitation.

8. The method of claim 1, wherein the provisioning rule includes a location identification.

9. The method of claim 1, wherein the provisioning rule includes a device identification.

10. The method of claim 1, wherein the processor is included within a router.

11. The method of claim 1, wherein the processor is included within a switch.

12. An apparatus for allocating a network resource in a home network, the apparatus comprising:

a processor in a customer premises equipment device coupled to the home network;

a user input device for defining an allocation rule;

a non-transitory machine-readable medium including instructions, which when executed by the processor, cause the processor to perform:

using a display to present a plurality of provisioning options to a user;

accepting a signal from a user input device to select one of the plurality of provisioning options, wherein the signal defines a provisioning rule for a particular device coupled to the home network;

using the processor to track data transferred with the particular device;

determining that the particular device's data transfers do not conform to the provisioning rule; and causing the particular device's data transfers to conform with the provisioning rule;

wherein the provisioning rule includes a user identification;

wherein the provisioning rule allows any of: providing constant bandwidth to the particular device during an entire duration of the particular device's data transfers to the particular device, assigning a particular input device to the particular device, or assigning a storage space to the particular device for storing data transferred to the particular device during the particular device's data transfers;

wherein the provisioning rule is place dependent, device dependent or user dependent.

13. The apparatus of claim 12, further comprising instructions, which when executed by the processors, cause the processor to perform: using a Boolean expression to determine the provisioning rule.

14. The apparatus of claim 12, wherein the provisioning rule includes processing cycles.

15. The apparatus of claim 12, wherein the provisioning rule includes power consumption.

16. The apparatus of claim 12, wherein the provisioning rule includes a location identification.

17. The apparatus of claim 12, wherein the provisioning rule includes a device identification.

18. An apparatus for allocating a network resource in a home network, the apparatus comprising:

a processor in a customer premises equipment device of the home network;

processing means coupled to the home network;

user input means for defining an allocation rule;

means for using a display to present a plurality of provisioning options to a user;

means for accepting a signal from the user input device to select one of the plurality of provisioning options, wherein the signal defines a provisioning rule for a particular device coupled to the home network; wherein the provisioning rule includes a user identification;

means for using the processor to track data transferred with the particular device;

means for determining, using the processor, that the particular device's data transfers do not conform to the provisioning rule; and means for causing, using the processor, the particular device's data transfers to conform with the provisioning rule; wherein the provisioning rule allows any of: providing constant bandwidth to the particular device during an entire duration of the particular device's data transfers to the particular device, assigning a particular input device to the particular device, or assigning a storage space to the particular device for storing data transferred to the particular device during the particular device's data transfers;

wherein the provisioning rule is place dependent, device dependent or user dependent.

19. The apparatus of claim 18, further comprising means for using a Boolean expression to determine the provisioning rule.

20. The apparatus of claim 18, wherein the provisioning rule includes one or more of the following: a shared storage limitation, a processing cycle limitation and a power consumption limitation.

* * * * *